United States Patent

Hasegawa et al.

[11] Patent Number: 5,914,372
[45] Date of Patent: *Jun. 22, 1999

[54] ETHYLENE COPOLYMER RUBBER COMPOSITION

[75] Inventors: Kenji Hasegawa, Suzuka; Akihiko Morikawa, Yokkaichi; Nobuyuki Sakabe, Yokkaichi; Fumio Tsutsumi, Yokkaichi, all of Japan

[73] Assignee: JSR Corporation, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/787,935

[22] Filed: Jan. 23, 1997

[51] Int. Cl.$^6$ ..................................................... C08F 36/00
[52] U.S. Cl. ............................................................. 525/332.8
[58] Field of Search ........................................... 525/332.8

[56] References Cited

U.S. PATENT DOCUMENTS 5,292,845   3/1994   Kawasaki et al. ........................ 526/336

FOREIGN PATENT DOCUMENTS

| 0094051 | 11/1983 | European Pat. Off. . |
|---|---|---|
| 0 552 946 | 7/1993 | European Pat. Off. . |
| 0 559 218 | 9/1993 | European Pat. Off. . |
| 0 718 325 | 6/1996 | European Pat. Off. . |
| 0751156 | 1/1997 | European Pat. Off. . |
| 62-121711 | 6/1987 | Japan . |
| 2-51512 | 2/1990 | Japan . |
| 5-262827 | 10/1993 | Japan . |
| 5-80493 | 11/1993 | Japan . |
| 6-128427 | 5/1994 | Japan . |
| 7-33896 | 2/1995 | Japan . |
| 7-33921 | 2/1995 | Japan . |
| 7-33922 | 2/1995 | Japan . |
| 7-33923 | 2/1995 | Japan . |
| 7-37431 | 2/1995 | Japan . |
| 7-53802 | 2/1995 | Japan . |
| WO 88/04673 | 6/1988 | WIPO . |

*Primary Examiner*—Edward J. Cain
*Attorney, Agent, or Firm*—Oblon, Spivak, McClelland, Maier & Neustadt, P.C.

[57] ABSTRACT

An ethylene copolymer rubber composition which comprises an ethylene copolymer rubber and at least one member selected from the group consisting of a vulcanizing agent and a cross-linking agent and optionally a conjugated diene rubber, said ethylene copolymer rubber being composed of ethylene, an α-olefin having 3 to 12 carbon atoms, a non-conjugated diene represented by the following structural formula (I):

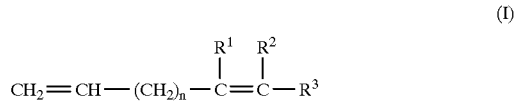

wherein $R^1$ and $R^2$ represent independently hydrogen atoms or alkyl groups having 1 to 8 carbon atoms, $R^3$ represents an alkyl group having 1 to 8 carbon atoms, and n is an integer of 2 to 10, and an α,ω-diene represented by the following structural formula (II):

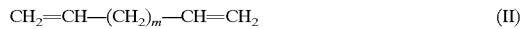

9 Claims, No Drawings

ETHYLENE COPOLYMER RUBBER COMPOSITION

BACKGROUND OF THE INVENTION

This invention relates to an ethylene copolymer rubber composition, more particularly to an ethylene copolymer rubber composition excellent in processing characteristics which have been the problem of an ethylene copolymer rubber produced with a metallocene catalyst, and also excellent in balance between the processing characteristics and mechanical and low-temperature characteristics. It relates also to an ethylene copolymer rubber composition in which a conjugated diene rubber is blended with the above-mentioned ethylene copolymer rubber, which is excellent in processing characteristics and co-vulcanizability with a conjugated diene rubbers Ethylene/α-olefin/non-conjugated diene copolymers are excellent in weather resistance, heat resistance, cold resistance, ozone resistance and the like, and have heretofore been widely used in constructive materials, automobile parts, wire-coating materials and the like.

Moreover, in recent years, there have been made many proposals of the production of an ethylene/α-olefin/non-conjugated diene copolymer obtained with a metallocene catalyst. The metallocene catalyst is excellent in copolymerizability of comonomers such as ethylene, an α-olefin, a non-conjugated diene and the like; has such characteristics that the molecular weight distribution of a polymer obtained is narrow and the composition distribution is uniform and the like; and also has such characteristics that even comonomers (for example, long chain α-olefins) which have been difficult to polymerize with a vanadium catalyst which has been a conventional polymerization catalyst for producing an ethylene/α-olefin/non-conjugated diene copolymer, can be easily polymerized.

In, for example, JP-B-5('93)-80,493, there is proposed a low-crystalline, ethylenic random copolymer in which the content of each of ethylene, α-olefin having 3 to 10 carbon atoms and non-conjugated diene is specified, each of intrinsic viscosity, molecular weight distribution ($M_w/M_n$), crystallinity, B value relevant to the mole fraction of α-olefin-ethylene chain and amount of a boiling methyl acetate-soluble portion is also specified, and neither αβ signal nor βγ signal based on the methylene chain between two adjacent tertiary carbon atoms are observed in the $^{13}$C-NMR spectrum.

As to a vulcanized rubber obtained from the above copolymer, mechanical characteristics such as modulus, tensile strength, elongation at break, hardness and the like have been examined; but the inherent characteristics of the ethylene/α-olefin/non-conjugated diene copolymer including processing characteristics, low-temperature characteristics and the like in addition to the above mechanical characteristics have not been collectively examined.

Furthermore, the present inventors have recently proposed in JP-A-2('90)-51512 a process for improving the co-vulcanizability of an ethylene/α-olefin/non-conjugated diene copolymer rubber with a conjugated diene rubber using a straight chain, non-conjugated diene, a representative of which is 7-methyl-1,6-octadiene, said process being higher in vulcanization rate than when 5-ethylidene-2-norbornene is used. In JP-A-5('93)-262827, it is disclosed that an ethylene/α-olefin/7-methyl-1,6-octadiene copolymer rubber obtained with a metallocene catalyst is excellent in low-temperature characteristics, and in JP-A-6-128427, it is disclosed that a blend composition of a conjugated diene rubber with an ethylene/α-olefin/7-methyl-1,6-octadiene copolymer obtained with a metallocene catalyst has an improved co-vulcanizability.

However, originally, the ethylene/α-olefin/non-conjugated diene copolymer and the conjugated diene rubber are inferior in compatibility with each other and the ethylene/α-olefin/non-conjugated diene copolymer obtained with a metallocene catalyst has a narrow molecular weight distribution, and hence, has such a disadvantage that the processability is inferior. Therefore, when it is kneaded by a Banbury mixer or the like, it does not well mix with the conjugated diene rubber. Thus, a rubber composition containing the conventional ethylene/α-olefin/non-conjugated diene copolymer has not been sufficiently satisfactory in processing characteristics.

On the other hand, as a method of improving the processing characteristics of a polymer obtained with a metallocene catalyst, there has been considered a method of combining a low molecular weight copolymer with a high molecular weight copolymer which is different in composition from the low molecular weight copolymer, and as a specific example thereof, there are mentioned a multistage method in which several reactors for producing the copolymer are connected in series and the polymerization is effected continuously, a method in which at least two catalysts different in reactivity are charged into a reactor, and the like. However, these methods have such problems that the productivity is low, which causes an increase in cost, the control of polymerization is difficult and the like. Therefore, the above methods cannot be said to be advisable in industry.

SUMMARY OF THE INVENTION

This invention has been made taking into consideration the above-mentioned situation in the prior art, and the problem to be solved is, first of all, to improve the processing characteristics of an ethylene/α-olefin/non-conjugated diene copolymer rubber produced with a metallocene catalyst, to provide an ethylene copolymer rubber composition excellent in balance between the processing characteristics and the mechanical characteristics and low-temperature characteristics.

Secondly, the problem is to provide an ethylene copolymer rubber composition excellent in processing characteristics, low-temperature characteristics, weather resistance, ozone resistance and the like by blending a conjugated diene rubber with the above-mentioned ethylene copolymer rubber, which is excellent in co-vulcanizability with the conjugated diene rubber and excellent in processing characteristics, without substantially impairing the mechanical characteristics and resistance to dynamic fatigue inherent to the conjugated diene rubber.

The present inventors have made extensive research for solving the above problems and have consequently found that a composition containing a specific ethylene copolymer rubber is endowed with an excellent balance of characteristics.

According to this invention, there is firstly provided an ethylene copolymer rubber composition (referred to hereinafter as the first invention) comprising an ethylene copolymer rubber and at least one member selected from the group consisting of a vulcanizing agent and a cross-linking agent, said ethylene copolymer rubber being composed of ethylene; an α-olefin having 3 to 12 carbon atoms; a non-conjugated diene represented by the following structural formula (I).

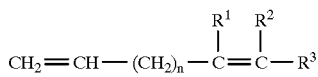
(I)

wherein $R^1$ and $R^2$ represent independently hydrogen atoms or alkyl groups having 1 to 8 carbon atoms, $R^3$ represents an alkyl group having 1 to 8 carbon atoms and n is an integer of 2 to 10; and an α,ω-diene represented by the following structural formula (II):

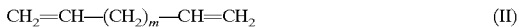
(II)

wherein m is an integer of 1 to 10, and satisfying the following requirements (1) to (6):

(1) The mole ratio of ethylene to α-olefin having 3 to 12 carbon atoms (ethylene/α-olefin) is in the range of from 40/60 to 90/10.

(2) The iodine value is in the range of from 5 to 45.

(3) The Mooney viscosity ($ML_{1+4}$, 100° C.) is in the range of from 15 to 350.

(4) The ratio of a polystyrene-reduced weight average molecular weight ($M_w$) determined by a gel permeation chromatography (GPC) to a polystyrene-reduced number average molecular weight ($M_n$) determined by a gel permeation chromatography ($M_w/M_n$) is in the range of from 2.5 to 15.

(5) The glass transition temperature ($T_g$) determined by a differential scanning calorimeter (DSC) is in the range of from −55° C. to −80° C.

(6) The branching index B as defined herein is in the range of from 0.60 to 0.95.

Secondly, this invention provides an ethylene copolymer rubber composition (referred to hereinafter as the second invention) which comprises the above-mentioned ethylene copolymer rubber, a conjugated diene rubber, at least one member selected from the group consisting of a vulcanizing agent and a cross-linking agent, the weight ratio of the above ethylene copolymer rubber to the above conjugated diene rubber (ethylene copolymer rubber/conjugated diene rubber) being in the range of from 20/80 to 90/10.

DETAILED DESCRIPTION OF THE INVENTION

The constituents of the ethylene copolymer rubber compositions of the first and second inventions are explained successively below.

The ethylene copolymer rubber in the first and second inventions is a copolymer composed of ethylene, an α-olefin having 3 to 12 carbon atoms (referred to hereinafter as merely the α-olefin), a non-conjugated diene represented by the above-mentioned structural formula (I) and an α,ω-diene represented by the above-mentioned structural formula (II).

The α-olefin includes, for example, propylene, 1-butene, 1-pentene, 3-methyl-1-butene, 1-hexene, 4-methyl-1-pentene, 1-heptene, 5-methyl-1-hexene, 1-octene, 5-ethyl-1-hexene, 1-nonene, 1-decene, 1-dodecene and the like. Preferably, propylene, 1-butene, 1-hexene and 1-octene are used. These α-olefins can be used alone or in admixture of two or more.

The mole ratio of ethylene to the α-olefin (ethylene/α-olefin) is in the range of from 40/60 to 90/10, preferably from 60/40 to 87/13. In this case, when the above mole ratio is less than 40/60, a sufficient mechanical strength is not exerted and when it exceeds 90/10, the rubber elasticity is damaged.

The non-conjugated diene represented by the structural formula (I) includes specifically 5-methyl-1,5-heptadiene, 6-methyl-1,5-heptadiene, 6-methyl-1,6-octadiene, 7-methyl-1,6-octadiene, 7-methyl-1,7-nonadiene, 8-methyl-1,7-nonadiene, 8-methyl-1,8-decadiene, 9-methyl-1,8-decadiene, 9-methyl-1,9-undecadiene, 10-methyl-1,9-undecadiene, 10-methyl-1,10-dodecadiene, 11-methyl-1,10-dodecadiene, 12-methyl-1,11-tridecadiene, 13-methyl-1,11-tridecadiene, 12-methyl-1,12-tetradecadiene, 13-methyl-1,12-tetradecadiene, 13-methyl-1,13-pentadecadiene, 14-methyl-1,13-pentadecadiene and the like. Preferably, there are used 6-methyl-1,5-heptadiene, 7-methyl-1,6-octadiene, 8-methyl-1,7-nonadiene and 9-methyl-1,8-decadiene. 7-Methyl-1,6-octadiene is particularly preferably used. These non-conjugated dienes can be used alone or in admixture of two or more.

The α,ω-diene represented by the structural formula (II) includes specifically 1,5-hexadiene, 1,6-heptadiene, 1,7-octadiene, 1,8-nonadiene, 1,9-decadiene, 1,10-undecadiene, 1,11-dodecadiene, 1,12-tridecadiene, 1,13-tetradecadiene and the like. Preferably used are 1,5-hexadiene, 1,7-octadiene and 1,9-decadiene.

The charge amount of the α,ω-diene represented by the structural formula (II) used in the first and second inventions is usually 0.5 to 30% by mol, preferably 1.5 to 15% by mol, based on a total charge amount of the α,ω-diene and the non-conjugated diene represented by the structural formula (I).

The iodine value of the ethylene copolymer rubber is in the range of from 5 to 45, preferably from 10 to 35. In this case, when the iodine value is less than 5, the mechanical strength is inferior and when it exceeds 45, the rubber elasticity is damaged.

The Mooney viscosity ($ML_{1+4}$, 100° C.) (referred to hereinafter as merely the Mooney viscosity) of the ethylene copolymer rubber is in the range of from 15 to 350, preferably from 20 to 300.

The ratio of the polystyrene-reduced weight average molecular weight ($M_w$) measured by a gel permeation chromatography (GPC) to the polystyrene-reduced number average molecular weight ($M_n$) measured by GPC ($M_w/M_n$) is in the range of from 2.5 to 15, preferably from 3 to 10.

The glass transition temperature ($T_g$) of the ethylene copolymer rubber determined by a differential scanning calorimeter (DSC) is in the range of from −55° C. to −80° C., preferably from −56° C. to −75° C.

In addition, the branching index B of the ethylene copolymer rubber is in the range of from 0.60 to 0.95, preferably from 0.70 to 0.92. The value of this branching index B is determined by calculating the intrinsic viscosity $[\eta_1]$ from $Mw_1$ determined by GPC measurement of the objective copolymer rubber using the viscosity equation $[\eta_0]=KMw_0$ in which K is a constant, determined from the intrinsic viscosity $[\eta_0]$ of the branch-free model copolymer rubber and the polystyrene-reduced weight average molecular weight ($Mw_0$) of the same copolymer rubber according to the viscosity-GPC method (Michio Kurata, Journal of Japan Rubber Associate, (45) 1972), and then dividing the found value $[\eta_2]$ of the objective copolymer rubber by the intrinsic viscosity $[\eta_1]$ calculated from the above viscosity equation. In this case, $[\eta_1]$ and $[\eta_2]$ are valued determined by measurement at 135° C. in o-dichlorobenzene, and $Mw_1$ is a value determined by measurement at 135° C. in o-dichlorobenzene by the GPC measurement method.

The ethylene copolymer rubber in the first and second inventions can be produced by an appropriate method such as a gas phase polymerization method, a solution polymerization method, a slurry polymerization method or the like. These polymerization operations can be carried out batchwise or continuously.

In the above-mentioned solution polymerization method or slurry polymerization method, an inactive hydrocarbon is used as a reaction medium.

As such an inactive hydrocarbon solvent, there are mentioned aliphatic hydrocarbons such as n-pentane, n-hexane, n-heptane, n-octane, n-decane, n-dodecane and the like; alicyclic hydrocarbons such as cyclohexane, methylcyclohexane and the like; aromatic hydrocarbons such as benzene, toluene, xylene and the like; etc. These hydrocarbon solvents can be used alone or in admixture of two or more. Also, the starting monomers can be utilized as the hydrocarbon solvent.

As a polymerization catalyst to be used in the production of the ethylene copolymer rubber in the first and second inventions, there can be mentioned, for example, an olefin polymerization catalyst composed of an organometallic compound and a compound of a transition metal selected from the group consisting of V, Ti, Zr and Hf. Each of the above transition metal compound and the above organometallic compound can be used alone or in admixture of two or more.

A particularly preferable example of said olefin polymerization catalyst is a metallocene catalyst composed of a metallocene compound and an organoaluminum compound or an ionic compound reactable with said metallocene compound to form an ionic complex.

A more specific explanation is made below of the polymerization catalyst for producing the ethylene copolymer rubber; however, other polymerization catalysts than mentioned below can be used in some cases.

As the above-mentioned metallocene catalyst, there are mentioned, for examples a catalyst composed of the following components (E) and (F) and a catalyst composed of the following components (G) and (H):

The component (E) is a transition metal compound represented by the following formula [1]:

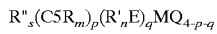
$$R''_s(C5R_m)_p(R'_nE)_q MQ_{4-p-q} \quad [1]$$

wherein M is a metal of Group 4 of the Periodic Table; $(C5R_m)$ is a cyclopentadienyl group or a substituted cyclopentadienyl group in which C5 represents a cyclopentadiene ring, the R groups are substituents on the cyclopentadiene ring and may be the same as or different from one another, each R represents a hydrogen atom, an alkyl group having 1 to 20 carbon atoms, an aryl group having 6 to 40 carbon atoms, an alkaryl group having 7 to 40 carbon atoms or an aralkyl group having 7 to 40 carbon atoms and two R groups bonded to two adjacent carbon atoms of the cyclopentadiene ring may be bonded to form a 4- to 8-membered carbon ring; E is an atom having an unbonded electron pair; R' represents an alkyl group having 1 to 20 carbon atoms, an aryl group having 6 to 40 carbon atoms, an alkaryl group having 7 to 40 carbon atoms or an aralkyl group having 7 to 40 carbon atoms; R" represents an alkylene group having 1 to 20 carbon atoms or a dialkylsilicon or a dialkylgermanium and is a group linking two ligands; s is 1 or 0; when s is 1, m is 4 and n is a numeral two smaller than the valence of the E atom; when s is 0, m is 5 and n is a numeral one smaller than the valence of the E atom; when $n \geq 2$, the R' groups may be the same as or different from one another and may be bonded to form a ring; Q represents a hydrogen atom, a halogen atom, an alkyl group having 1 to 20 carbon atoms, an aryl group having 6 to 40 carbon atoms, an alkaryl group having 7 to 40 carbon atoms or an aralkyl group having 7 to 40 carbon atoms; and p and q are integers of 0 to 4 and satisfy the relation of $0<p+q\leq 4$.

Specific examples of the component (E) include bis(cyclopentadienyl)zirconium dichloride, bis(cyclopentadienyl)zirconium dibromide, bis(cyclopentadienyl)zirconium dimethyl, bis(cyclopentadienyl)zirconium diphenyl, dimethylsilylbis(cyclopentadienyl)zirconium dichloride, dimethylsilylbis(cyclopentadienyl)zirconium dimethyl, methylenebis(cyclopentadienyl)zirconium dichloride, ethylenebis(cyclopentadienyl)zirconium dichloride, bis(indenyl)zirconium dichloride, bis(indenyl)zirconium dimethyl, dimethylsilylbis(indenyl)zirconium dichloride, methylenebis(indenyl)zirconium dichloride, bis(4,5,6,7-tetrahydroindenyl)zirconium dichloride, bis(4,5,6,7-tetrahydroindenyl)zirconium dimethyl, dimethylsilylbis(4,5,6,7-tetrahydroindenyl)zirconium dichloride, dimethylsilylbis(4,5,6,7-tetrahydroindenyl)zirconium dimethyl, ethylenebis(4,5,6,7-tetrahydroindenyl)zirconium dichloride, bis(methylcyclopentadienyl)zirconium dichloride, bis(methylcyclopentadienyl)zirconium dimethyl, dimethylsilylbis(3-methyl-1-cyclopentadienyl)zirconium dichloride, methylenebis(3-methyl-1-cyclopentadienyl)zirconium dichloride, bis(tert-butylcyclopentadienyl)zirconium dichloride, dimethylsilylbis(3-tert-butyl-1-cyclopentadienyl)zirconium dichloride, bis(1,3-dimethylcyclopentadienyl)zirconium dichloride, dimethylsilylbis(2,4-dimethyl-1-cyclopentadienyl)zirconium dichloride, bis(1,2,4-trimethylcyclopentadienyl)zirconium dichloride, dimethylsilylbis(2,3,5-trimethyl-1-cyclopentadienyl)zirconium dichloride, bis(fluorenyl)zirconium dichloride, dimethylsilyl(fluorenyl)zirconium dichloride, (fluorenyl)(cyclopentadienyl)zirconium dichloride, dimethylsilyl(fluorenyl)(cyclopentadienyl)zirconium dichloride, isopropylene(fluorenyl)(cyclopentadienyl)zirconium dichloride, (tert-butylamido)-(1,2,3,4,5-pentamethylcyclopentadienyl)zirconium dichloride, dimethylsilyl(tert-butylamido)(2,3,4,5-tetramethyl-1-cyclopentadienyl)zirconium dichloride, methylene(tert-butylamido)(2,3,4,5-tetramethyl-1-cyclopentadienyl)zirconium dichloride, (phenoxy)(1,2,3,4,5-pentamethylcyclopentadienyl)zirconium dichloride, dimethylsilyl(o-phenoxy)(2,3,4,5-tetramethyl-1-cyclopentadienyl)zirconium dichloride, methylene(o-phenoxy)(2,3,4,5-tetramethyl-1-cyclopentadienyl)zirconium dichloride, ethylene(o-phenoxy)(2,3,4,5-tetramethyl-1-cyclopentadienyl)zirconium dichloride, bis(dimethylamido)zirconium dichloride, bis(diethylamido)zirconium dichloride, bis(di-tert-butylamido)zirconium dichloride, dimethylsilylbis(methylamido)zirconium dichloride, dimethylsilylbis(tert-butylamido)zirconium dichloride and the like, and compounds obtained by replacing the zirconium of the above-mentioned compounds with titanium or hafnium, and the like. However, the component (E) is not limited thereto. The above-mentioned transition metal compounds can be used alone or in admixture of two or more.

The component (F) is an aluminoxane compound having units represented by the following general formula [2] and it is inferred that the aluminoxane compound would be a linear, cyclic or cluster-like compound or a mixture of these compounds though the chemical structure of the compound is not necessarily definite:

$$\text{---[Al(R}^a\text{)---O]---} \qquad [2]$$

wherein $R^a$ represents an alkyl group having 1 to 20 carbon atoms, an aryl group having 6 to 40 carbon atoms, an alkaryl group having 7 to 40 carbon atoms or an aralkyl group having 7 to 40 carbon atoms, preferably a methyl group, an ethyl group or an isobutyl group and particularly preferably a methyl group.

The above-mentioned aluminoxane compound can be produced by a known method comprising a reaction of an organoaluminum compound having at least one $R^a$ group with water.

The proportion of the component (E) to the component (F) used is usually in the range of from 1/1 to 1/100,000, preferably from 1/5 to 1/50,000, in terms of mole ratio of transition metal to aluminum atom (transition metal/aluminum atom).

The component (G) is a transition metal alkyl compound represented by the following general formula [3]

$$R'''_s(C5\text{---}R_m)_p(R'_nE)_q MR'''_{4-p-q} \qquad [3]$$

wherein H is a metal of Group 4 of the Periodic Table; (C5—$R_m$) is a cyclopentadienyl group or a substituted cyclopentadienyl group in which C5 represents a cyclopentadiene ring, the R groups are substituents on the cyclopentadiene ring and may be the same as or different from one another, each R represents a hydrogen atom, an alkyl group having 1 to 20 carbon atoms, an aryl group having 6 to 40 carbon atoms, an alkaryl group having 7 to 40 carbon atoms or an aralkyl group having 7 to 40 carbon atoms and two R groups bonded to two adjacent carbon atoms of the cyclopentadiene ring may be bonded to form a 4- to 8-membered ring; E is an atom having an unbonded electron pair; R' is an alkyl group having 1 to 20 carbon atoms, an aryl group having 6 to 40 carbon atoms, an alkaryl group having 7 to 40 carbon atoms or an aralkyl group having 7 to 40 carbon atoms; R" is an alkylene group having 1 to 20 carbon atoms, a dialkylsilicon or a dialkylgermanium and is a group linking two ligands; s is 1 or 0; when s is 1, m is 4 and n is a numeral two smaller than the valence of the E atom; when s is 0, m is 5 and n is a numeral one smaller than the valence of the E atom; and when n≧2, the R' groups may be the same as or different from one another or may be bonded to form a ring; R''' is an alkyl group having 1 to 20 carbon atoms, an aryl group having 6 to 40 carbon atoms, an alkaryl group having 7 to 40 carbon atoms or an aralkyl group having 7 to 40 carbon atoms; p and q are integers of 0 to 3 and satisfy the relation of 0<p+q≦4.

Specific examples of the component (G) include bis(cyclopentadienyl)zirconium dimethyl, bis(cyclopentadienyl)zirconium diethyl, bis(cyclopentadienyl) zirconium diisobutyl, bis(cyclopentadienyl)zirconium diphenyl, bis(cyclopentadienyl)zirconium di{bis (trimethylsilyl)methyl}, dimethylsilylbis(cyclopentadienyl) zirconium dimethyl, dimethylsilylbis(cyclopentadienyl) zirconium diisobutyl, methylenebis(cyclopentadienyl) zirconium dimethyl, ethylenebis(cyclopentadienyl) zirconium dimethyl, bis(indenyl)zirconium dimethyl, bis (indenyl)zirconium diisobutyl, dimethylsilylbis(indenyl) zirconium dimethyl, methylenebis(indenyl)zirconium dimethyl, ethylenebis(indenyl)zirconium dimethyl, bis(4,5,6,7-tetrahydro-1-indenyl)zirconium dimethyl, dimethylsilylbis(4,5,6,7-tetrahydro-1-indenyl)zirconium dimethyl, ethylenebis-(4,5,6,7-tetrahydroindenyl)zirconium dimethyl, bis(methylcyclopentadienyl)zirconium dimethyl, dimethylsilylbis(3-methyl-1-cyclopentadienyl)zirconium dimethyl, bis(tert-butylcyclopentadienyl)zirconium dimethyl, dimethylsilylbis(3-tert-butyl-1-cyclopentadienyl) zirconium dimethyl, bis(1,3-dimethylcyclopentadienyl) zirconium diisobutyl, bis(1,3-dimethylcyclopentadienyl) zirconium diisobutyl, dimethylsilylbis(2,4-dimethyl-1-cyclopentadienyl)zirconium dimethyl, methylenebis(2,4-dimethyl-1-cyclopentadienyl)zirconium dimethyl, ethylenebis(2,4-dimethyl-1-cyclopentadienyl)zirconium dimethyl, bis(1,2,4-trimethylcyclopentadienyl)zirconium dimethyl, dimethylsilylbis(2,3,5-trimethyl-1-cyclopentadienyl)zirconium dimethyl, bis(fluorenyl) zirconium dimethyl, dimethylsilylbis(fluorenyl)zirconium dimethyl, (fluorenyl)(cyclopentadienyl)zirconium dimethyl, dimethylsilyl(fluorenyl)(cyclopentadienyl)zirconium dimethyl, isopropylene(fluorenyl)(cyclopentadienyl) zirconium dimethyl, (tert-butylamido)(1,2,3,4,5-pentamethylcyclopentadienyl)zirconium dimethyl, dimethylsilyl(tert-butylamido)(2,3,4,5-tetramethyl-1-cyclopentadienyl)zirconium dimethyl, methylene(tert-butylamido)(2,3,4,5-tetramethyl-1-cyclopentadienyl) zirconium dimethyl, (phenoxy)(1,2,3,4,5-pentamethylcyclopentadienyl)zirconium dimethyl, dimethylsilyl(o-phenoxy)(2,3,4,5-tetramethyl-1-cyclopentadienyl)zirconium dimethyl, methylene(o-phenoxy)(2,3,4,5-tetramethyl-1-cyclopentadienyl) zirconium dimethyl, bis(dimethylamido)zirconium dimethyl, bis(diethylamido)zirconium dimethyl, bis(di-tert-butylamido)zirconium dimethyl, dimethylsilylbis (methylamido)zirconium dimethyl, dimethylsilylbis(tert-butylamido)zirconium dimethyl and the like and these zirconium compounds in which the zirconium has been replaced with titanium or hafnium. However, the component (G) is not limited thereto. The above transition metal alkyl compounds can be used alone or in admixture of two or more.

The transition metal alkyl compound may be previously synthesized or may be formed by contacting a transition metal halide represented by the formula [3] in which R" is a halogen atom with an organometallic compound such as trimethylaluminum, triethylaluminum, diethylaluminum monochloride, triisobutylaluminum, methyllithium, butyllithium or the like in the reaction system.

The component (H) is an ionic compound represented by the following general formula [4]:

$$([L]^{k+})_p([M'A_1A_2\ldots A_n]^-)_q \qquad [4]$$

wherein $[L]^{k+}$ is a Brønsted acid or a Lewis acid; M' is an element of Groups 13 to 15 of the Periodic Table; $A_1$ to $A_n$ are independently hydrogen atoms, halogen atoms, alkyl groups having 1 to 20 carbon atoms, dialkylamino groups having 1 to 30 carbon atoms, alkoxyl groups having 1 to 20 carbon atoms, aryl groups having 6 to 40 carbon atoms, aryloxy groups having 6 to 40 carbon atoms, alkaryl groups having 7 to 40 carbon atoms, aralkyl groups having 7 to 40 carbon atoms, halogen-substituted hydrocarbon groups having 1 to 40 carbon atoms, acyloxy groups having 1 to 20 carbon atoms or organometaloid groups; k is the ionic valence of L and an integer of 1 to 3; p is an integer of 1 or more and q=(k×p).

Specific examples of the component (H) includes trimethylammonium tetraphenylborate, triethylammonium tetraphenylborate, tri-n-butylammonium tetraphenylborate, methyl(di-n-butyl)ammonium tetraphenylborate, dimethylanilinium tetraphenylborate, methylpyridinium tetraphenylborate, methyl(2-cyanopyridinium)

tetraphenylborate, methyl(4-cyanopyridinium) tetraphenylborate, trimethylammonium tetrakis (pentafluorophenyl)borate, triethylammonium tetrakis (pentafluorophenyl)borate, triethylammonium tetrakis (pentafluorophenyl)borate, tri-n-butylammonium tetrakis (pentafluorophenyl)borate, methyl(di-n-butyl)ammonium tetrakis(pentafluorophenyl)borate, dimethylanilinium tetrakis(pentafluorophenyl)borate, methylpyridinium tetrakis(pentafluorophenyl)borate, methyl(2-cyanopyridinium) tetrakis(pentafluorophenyl)borate, methyl (4-cyanopyridinium) tetrakis(pentafluorophenyl)borate, dimethylanilinium tetrakis[3,5,-di-(trifluoromethyl)phenyl] borate, ferrocenium tetraphenylborate, silver tetraphenylborate, ferrocenium tetrakis(pentafluorophenyl) borate and the like. However, the component (H) is not limited thereto. The above-mentioned ionic compounds can be used alone or in admixture of two or more.

The proportions of the components (G) and (H) used are usually in the range of from 1/0.5 to 1/20, preferably from 1/0.8 to 1/10 in terms of the (G)/(H) mole ratio.

The above-mentioned metallocene catalyst used in the production of the ethylene copolymer rubber of the first and second inventions can be used in the form that at least a part thereof is supported on a suitable carrier. The kind of the carrier is not critical, and there may be used any of inorganic oxide carriers, other inorganic carriers and organic carriers. The method of supporting on the carrier is not critical and a known method may be appropriately utilized.

The conjugated diene rubber in the second invention includes, for example, natural rubber, styrene-butadiene rubber, polybutadiene rubber, acrylonitrile-butadiene rubber, polyisoprene rubber and the like and also hydrogenated products of these rubbers. Preferably, there are used natural rubber, styrene-butadiene rubber, polybutadiene rubber and polyisoprene rubber. The degree of hydrogenation of the above hydrogenated products of the rubbers is usually 20 to 99%, preferably 50 to 95%. These conjugated diene rubbers can be used alone or in admixture of two or more.

The Mooney viscosity of the conjugated diene rubber is preferably 10 to 100, more preferably 20 to 80.

The weight ratio of the ethylene copolymer rubber to the conjugated diene rubber (ethylene copolymer rubber/ conjugated diene rubber) in the ethylene copolymer rubber composition of the second invention is in the range of from 20/80 to 90/10, preferably from 30/70 to 70/30 and most preferably from 50/50 to 70/30. In this case, when the above weight ratio is less than 20/80, the ozone resistance of the vulcanized rubber is inferior and when the weight ratio exceeds 90/10, the mechanical strength of the vulcanized rubber is insufficient in some cases, and hence, these weight ratios are not desirable.

Among the vulcanizing agent and cross-linking agent used in the first and second inventions, the vulcanizing agent includes, for example, sulfurs such as powdery sulfur, precipitated sulfur, colloidal sulfur, insoluble sulfur and the like; inorganic vulcanizing agents such as sulfur chloride, selenium, tellurium and the like; sulfur-containing organic compounds such as morpholine disulfide, alkylphenol disulfides, thiuram disulfides, dithiocarbamic acid salts and the like; etc. These vulcanizing agents can be used alone or in admixture of two or more.

The amount of the vulcanizing agent compounded is, in the first invention, usually 0.1 to 10 parts by weight, preferably 0.5 to 5 parts by weight, per 100 parts by weight of the ethylene copolymer rubber and, in the second invention, usually 0.1 to 10 parts by weight, preferably 0.5 to 5 parts by weight, per 100 parts by weight of a total of the ethylene copolymer rubber and the conjugated diene rubber.

A vulcanization accelerator can be used together with the above vulcanizing agent.

Such a vulcanization accelerator includes, for example, aldehyde-ammonia adducts such as hexamethylenetetramine and the like; guanidines such as diphenylguanidine, di(o-tolyl)guanidine, o-tolyl biguanide and the like; thioureas such as thiocarbanilide, di(o-tolyl)thiourea, N,N'-diethylthiourea, tetramethylthiourea, trimethylthiourea, dilaurylthiourea and the like; thiazoles such as mercaptobenzothiazole, dibenzothiazole disulfide, 2-(4-morpholinothio)benzothiazole, 2-(2,4-dinitrophenyl) mercaptobenzothiazole, (N,N'-diethylthiocarbamoylthio) benzothiazole and the like; sulfenamides such as N-tert-butyl-2-benzothiazyl sulfenamide, N,N'-dicyclohexyl-2-benzothiazyl sulfenamide, N,N'-diisopropyl-2-benzothiazyl sulfenamide, N-cyclohexyl-2-benzothiazyl sulfenamide and the like; thiurams such as tetramethylthiuram disulfide, tetraethylthiuram disulfide, tetra-n-butylthiuram disulfide, tetramethylthiuram monosulfide, dipentamethylenethiuram tetrasulfide and the like; carbamic acid salts such as zinc dimethylthiocarbamate, zinc diethylthiocarbamate, zinc di-n-butylthiocarbamate, zinc ethylphenyldithiocarbamate, sodium dimethyldithiocarbamate, copper dimethyldithiocarbamate, tellurium dimethylthiocarbamate, iron dimethylthiocarbamate and the like; xanthogenic acid salts such as zinc butylthioxanthogenate and the like; etc. These vulcanization accelerators can be used alone or in admixture of two or more.

The amount of the vulcanization accelerator compounded is, in the first inventions usually 0.1 to 20 parts by weight, preferably 0.2 to 10 parts by weight, per 100 parts by weight of the ethylene copolymer rubber, and in the second inventions usually 0.1 to 20 parts by weight, preferably 0.2 to 10 parts by weight, per 100 parts by weight of a total of the ethylene copolymer rubber and the conjugated diene rubber.

In addition to the above-mentioned vulcanizing agent and vulcanization accelerators if necessary, a vulcanization accelerating coagent can be added.

Such a vulcanization accelerating coagent includes, for example, metal oxides such as magnesium oxide, zinc white, litharge, red lead, white lead and the like; organic acids and their salts such as stearic acid, oleic acid, zinc stearate and the like; etc, and zinc white and stearic acid are particularly preferred. These vulcanization accelerating coagents can be used alone or in admixture of two or more.

The amount of the vulcanization accelerating coagent compounded is, in the first invention, usually 0.5 to 20 parts by weight per 100 parts by weight of the ethylene copolymer rubber and in the second invention, usually 0.5 to 20 parts by weight per 100 parts by weight of a total of the ethylene copolymer rubber and the conjugated diene rubber.

The cross-linking agent includes, for example, organic peroxides such as 1,1-di-tert-butylperoxy-3,3,5-trimethylcyclohexane, di-tert-butyl peroxide, dicumyl peroxide, tert-butylcumyl peroxide, 2,5-dimethyl-2,5-di (tert-butylperoxy)hexane, 1,3-bis(tert-butylperoxyisopropyl)benzene and the like; etc. These cross-linking agents can be used alone or in admixture of two or more.

The amount of the cross-linking agent compounded is, in the first invention, usually 0.1 to 15 parts by weight, preferably 0.5 to 10 parts by weight, per 100 parts by weight of the ethylene copolymer rubber and in the second invention, usually 0.1 to 15 parts by weight, preferably 0.5 to 10 parts by weight, per 100 parts by weight of a total of the ethylene copolymer rubber and the conjugated diene rubber.

Moreover, a cross-linking coagent can be used along with the above-mentioned cross-linking agent.

Such a cross-linking coagent includes, for example, sulfur, sulfur compounds such as dipentamethylenethiuram tetrasulfide and the like; poly-functional monomers such as ethylene di(meth)acrylate, polyethylene di(meth)acrylate, divinylbenzene, diallyl phthalate, triallyl cyanurate, metaphenylenebismaleimde, toluylenebismalemide and the like; oxime compounds such as p-quinoneoxime, p,p'-benzoylquioneoxime and the like; etc. These cross-linking coagents can be used alone or in admixture of two or more.

The amount of the cross-linking coagent compounded is, in the first invention, usually 0.5 to 20 parts by weight per 100 parts by weight of the ethylene copolymer rubber and in the second invention, usually 0.5 to 20 parts by weight per 100 parts by weight of a total of the ethylene copolymer rubber and the conjugated diene rubber.

Furthermore, the ethylene copolymer rubber composition in the first and second inventions can have compounded therewith a filler or a softening agent.

The above filler includes, for example, carbon blacks such as SRF, FEF, HAF, ISAF, SAF, FT, MT and the like; inorganic fillers such as white carbon, finely divided magnesium silicate, calcium carbonate, magnesium carbonate, clay, talc and the like; etc. These fillers can be used alone or in admixture of two or more.

The amount of the filler compounded is, in the first invention, usually 10 to 200 parts by weight, preferably 10 to 100 parts by weight, per 100 parts by weight of the ethylene copolymer rubber and in the second invention, usually 10 to 200 parts by weight, preferably 10 to 100 parts by weight, per 100 parts by weight of a total of the ethylene copolymer rubber and the conjugated diene rubber.

The softening agent includes, for example, process oils such as aromatic oils, naphthenic oils, paraffin oils and the like which are usually used in rubbers; vegetable oils such as coconut oil and the like; synthetic oils such as alkylbenzene oils and the like; etc. Among them, process oils are preferable and paraffin oil is particularly preferable. The above softening agents can be used alone or in admixture of two or more.

The amount of the softening agent compounded is, in the first invention, usually 10 to 130 parts by weight, preferably 20 to 100 parts by weight, per 100 parts by weight of the ethylene copolymer rubber, and in the second invention, usually 10 to 130 parts by weight, preferably 20 to 100 parts by weight, per 100 parts by weight of a total of the ethylene copolymer rubber and the conjugated diene rubber.

Furthermore, the ethylene copolymer rubber compositions of the first and second inventions can be used in admixture with at least one other rubber or resin selected from the group consisting of other ethylene/$\alpha$-olefin/non-conjugated diene copolymers ethylene/$\alpha$-olefin copolymers, polyethylene, polypropylene and the like.

In the preparation of the ethylene copolymer rubber compositions of the first and second inventions, there can be used conventional kneaders, extruders, vulcanizing apparatus and the like.

The method and order of compounding the vulcanizing agent and/or the cross-linking agent, the filler, the softening agent and the like with the ethylene copolymer rubber alone or together with the conjugated diene rubber are as follows: Using a Banbury mixer or the like, the ethylene copolymer rubber alone or together with the conjugated diene rubber is mixed with the filler, the softening agent and the like, and thereafter, using a roll or the like, the resulting mixture was mixed with the vulcanizing agent and/or the cross-linking agent. However, the compounding method and order are not limited thereto Subsequently, from the ethylene copolymer rubber composition, a vulcanized rubber can be produced by a conventional method of producing a vulcanized rubber, for example, by placing the ethylene copolymer rubber in a mold and elevating the temperature in the mold to vulcanize the composition or forming the composition into any desired shape by means of an extruder and then heating the shaped composition in a vulcanizing vessel to vulcanize the composition.

The ethylene copolymer rubber composition of the first invention can be suitably employed in various wires, electric insulating parts, roofings, tubes, belts, materials for civil engineering and construction, rubber rolls, rubber vibration insulators, sponge products and also in uses as automobile parts such as weather strips, radiator hoses, heater hoses, brake hoses, protectors, muffler hangers, radiator packings, brake cups, packings for lamp, bumpers and the like.

The ethylene copolymer rubber composition of the second invention can be suitably used in tires, rubber vibration insulators, window frames, various weather strips, materials for civil engineering and construction and the like.

DESCRIPTION OF THE PREFERRED EMBODIMENTS

Examples are shown below to explain this invention in more detail. However, this invention should not be construed to be limited to the Examples.

In the Examples and the Comparative Examples, measurement and evaluation were conducted by the following methods:

(a) $\alpha$-Olefin Content

Measured by a $^{13}$C-NMR method, provided that the ethylene content (mole %) and the $\alpha$-olefin content (mole %) in each Example and each Comparative Example were based on a total (100 mole %) of the ethylene content and the $\alpha$-olefin content.

(b) Iodine Value

Measured by an infrared absorption spectrum method.

(c) Mooney Viscosity

Measured according to JIS K6300 under such conditions that the measurement temperature was 100° C., the preheating time was 1 minute and the time taken until the viscosity was read was 4 minutes.

(d) $M_w/M_n$

Measured by GPC at 135° C. in o-chlorobenzene.

(e) Glass Transition Temperature $T_g$

Using a differential scanning calorimeter Model 910 manufactured by DU PONT INSTRUMENT, a sample was heated to 180° C. and then cooled at a rate of 10° C./min to −90° C., and thereafter, measurement was conducted while the temperature was elevated at a rate of 20° C./min.

(f) Branching Index B

Measured by Model 150CV GPC manufactured by Waters Company in o-dichlorobenzene at a sample concentration of 0.15% by weight at 135° C.

(g) Roll-Processability

The roll-processability was judged using the following five ratings:

5: The rubber band was completely bonded to the roll, and the bank was smoothly rotated.

4: The rubber band was sometimes separated from the surface of the roll between the top of the roll and the bank.

3: The rubber band was considerably separated from the surface of the roll between the top of the roll and the bank.

2: The rubber band did not well bond to the surface of the roll but hung therefrom, and the roll processing was impossible without supporting the rubber band with a hand.

1: The rubber band did not bond at all to the surface of the roll but hung therefrom, and the roll processing was impossible without supporting the rubber band with a hand.

(h) Tack During Roll-Working

The tack to the roll was judged using 4 ratings of excellent (◎), good (O), fair (Δ) and bad (x).

(i) Dumped Compound Appearance in Plastomill

The dischargability of a rubber compound during kneading in a plastomill was evaluated based on the following 4 ratings:

◎: dischargability was excellent, O: dischargability was good, Δ: coherence of discharged rubber was somewhat bad, x: discharged rubber did not cohere.

(j) Tensile Test

Tensile strength TB (MPa) and elongation at break EB (%) were measured according to JIS K6301 using a No. 3 test specimen under the conditions of a measurement temperature of 25° C. and a drawing speed of 500 mm/min.

(k) Hardness Test

Spring hardness (JIS-A hardness) was measured according to JIS K6301.

(l) Compression Set Test

Measured according to JIS K6301 under the conditions of 70° C.×22 hours.

(m) Low-Temperature Torsion Test (Gehman Temperature)

T5 (°C.) was measured according to JIS K6301.

(n) Vulcanization Characteristics Test

Using Curastometer Model V manufactured by Japan Synthetic Rubber Co., Ltd., the torque maximum MH was determined from vulcanization curve under the conditions of 160° C.×30 minutes.

(o) Elongation Fatigue Test (Crack Propagation)

A No. 1 dumbbell specimen as stated in JIS K6301 was prepared and previously cracked at the center in the longitudinal direction, and the resulting 10 cracked specimens were subjected to elongation fatigue under the conditions of an elongation of 75%, a measurement temperature of 30° C. and a revolution rate of 300 rpm, and an average value of cycles required until the test specimen was broken was determined.

(Crack Generation)

The same test specimens as above, except that they were not previously cracked, were subjected to the same test as in the above crack propagation test, except that the elongation was 100%, and an average value of cycles required until the test specimen was broken was determined.

(p) Ozone Resistance Test

The crack generation time was measured according to JIS-K6301 under the conditions of an ozone concentration of 50 phm and an elongation of 50% and used as an index of ozone resistance. The test period was 14 days.

EXAMPLE 1

(Production of Ethylene Copolymer Rubber)

In a 3-liter, stainless steel autoclave which had been sufficiently purged with nitrogen were placed 1.45 liters of purified toluene, 450 milliliters of 1-octene, 45 milliliters of 7-methyl-1,6-octadiene and 1.7 milliliters (8.9 millimoles) of 1,9-decadiene, and the temperature was elevated to 30° C., after which the internal pressure of the autoclave was adjusted to 5 kg/cm² while ethylene was continuously fed at a rate of 14 normal liters/minute.

Separately, into a sufficiently nitrogen-purged, 50-milliliter glass flask in which a magnetic stirrer had been placed were charged with $3.0\mu$ moles of isopropylene (fluorenyl)(cyclopentadienyl)zirconium dichloride dissolved in 3.0 milliliters of purified toluene and 1.5 millimoles of triisobutylaluminum dissolved in 6.0 milliliters of purified toluene, and they were stirred at room temperature for 30 minutes to subject them to reaction. Subsequently, $3.6\mu$ moles of dimethylanilinium tetrakis (pentafluorophenyl)borate dissolved in 7.2 milliliters of purified toluene was added to the reaction mixture, and they were stirred at room temperature for 20 minutes to subject them to reaction, thereby obtaining a polymerization catalyst.

This polymerization catalyst was fed to the above autoclave to start polymerization. During the reaction, the temperature was kept at 30° C., the internal pressure of the autoclave was kept at 5 kg/cm² while ethylene was fed continuously, under which conditions polymerization was effected for 15 minutes.

Subsequently, a small amount of methanol was added to terminate the reaction, after which the solvent was removed by steam stripping and the product was dried on a 6-inch roll to obtain 155 g of a polymer.

This polymer was an ethylene/1-octene/7-methyl-1,6-octadiene/1,9-decadiene copolymer rubber having an ethylene content of 71.5 mole %, a 1-octene content of 28.5 mole %, an iodine value of 15.5, a Mooney viscosity of 45, an $M_w/M_n$ ratio of 5.5, a $T_g$ of −68.7° C. and a branching index B of 0.835. This ethylene copolymer rubber is referred to hereinafter as Copolymer Rubber (R1).

(Preparation and Evaluation of Rubber Composition)

Copolymer Rubber (R1) was kneaded with the components shown in Table 3 other than the vulcanizing agent components using a Laboplastomill (inner volume: 250 milliliters) at 60 rpm at 60° C. for 150 seconds to obtain a compound (i). Subsequently, to the compound (i) were added the vulcanizing agent components shown in Table 3 and they were kneaded for 5 minutes on a 10-inch roll kept at 50° C. to obtain a compound (ii).

Subsequently, this compound (ii) was heated by a hot press heated at 160° C. under such pressure that the press pressure was 150 kgf/cm² for 30 minutes to prepare a vulcanized sheet having a size of 120×120×2 mm and a sample for compression set test and these were subjected to evaluation of various characteristics.

As a result, the composition using Copolymer Rubber (R1) was low in hardness and excellent in balance between the processing characteristics and the mechanical characteristics and low-temperature characteristics. The evaluation results are shown in Table 4.

EXAMPLE 2

(Production of Ethylene Copolymer Rubber)

In a 3-liter, stainless steel autoclave which had been sufficiently purged with nitrogen were placed 1.9 liters of purified toluene, 45 milliliters of 7-methyl-1,6-octadiene, 17 milliliters (8.9 millimoles) of 1,9-decadiene and 18 milliliters, in terms of aluminum atom, of methylaluminoxane dissolved in 15 milliliters of purified toluene, and the temperature was elevated to 30° C., after which the internal pressure of the autoclave was adjusted to 4 kg/cm² while ethylene and propylene were continuously fed each at a rate of 12 normal liters/min. Subsequently, 3.6μ moles of ethylenebis(indenyl)zirconium dichloride dissolved in 4.5 milliliters of toluene was fed to the autoclave to start polymerization. During the reaction, the temperature was kept at 30° C., and the internal pressure of the autoclave was kept at 4 kg/cm² while ethylene and propylene were continuously fed, under which conditions polymerization was effected for 15 minutes. Subsequently, a small amount of methanol was fed to the autoclave to terminate the reaction, after which the solvent was removed by steam stripping and the product was dried on a 6-inch roll to obtain 161 g of a polymer.

This polymer was an ethylene/propylene/7-methyl-1,6-octadiene/1,9-decadiene copolymer rubber having an ethylene content of 75 mole %, a propylene content of 25 mole %, an iodine value of 13, a Mooney viscosity of 95, an $M_w/M_n$ ratio of 4.8, a $T_g$ of -58.7° C. and a branching index B of 0.892. This ethylene copolymer rubber is referred to hereinafter as Copolymer Rubber (R2).

(Preparation and Evaluation of Rubber Composition)

In the same manner as in Example 1, except that Copolymer Rubber (R2) was substituted for the Copolymer Rubber (R1), a compound (i) and a compound (ii) were prepared and various physical properties were evaluated.

As a result, the composition using Copolymer Rubber (R2) was excellent in balance between the processing characteristics and the mechanical characteristics and low-temperature characteristics. The evaluation results are shown in Table 4.

EXAMPLES 3 TO 8

In the same manner as in Example 1 or Example 2, Copolymer Rubbers (R3) to (R8) shown in Table 1 were produced; compounds (i) and compounds (ii) were prepared; and various physical properties were evaluated.

As a result, the compositions using these Copolymer Rubbers were excellent in balance between the processing characteristics and the mechanical characteristics and low-temperature characteristics. The evaluation results are shown in Table 4.

COMPARATIVE EXAMPLES 1 TO 4

In the same manner as in Example 1 or Example 2, Copolymer Rubbers (r1) to (r4) shown in Table 2 were produced; compounds (i) and compounds (ii) were prepared; and various physical properties were evaluated.

As a result, the compositions using these Copolymer Rubbers were insufficient in balance between the processing characteristics and the mechanical characteristics and low-temperature characteristics. The evaluation results are shown in Table 5.

TABLE 1

| | Example | | | | | | | |
|---|---|---|---|---|---|---|---|---|
| | 1 | 2 | 3 | 4 | 5 | 6 | 7 | 8 |
| Copolymer rubber | R1 | R2 | R3 | R4 | R5 | R6 | R7 | R8 |
| Ethylene content (mole %) | 71.5 | 75 | 78.5 | 65 | 85 | 65 | 85 | 79 |
| α-olefin | 1-Octene | Pro-pylene | 1-Octene | 1-Octene | 1-Octene | Pro-pylene | Pro-pylene | 1-Octene |
| Non-conjugated diene | MOD(*2) | MOD(*2) | MOD(*2) | MOD(*2) | MOD(*2) | MOD(*2) | MOD(*2) | MHD(*4) |
| α, ω-Diene | DD(*3) | DD(*3) | DD(*3) | DD(*3) | DD(*3) | DD(*3) | DD(*3) | OD(*5) |
| Amount of α, ω-diene (mole %)(*1) | 3.2 | 3.2 | 3.5 | 6.4 | 2.7 | 6.1 | 2.7 | 3.5 |
| Iodine value | 15.5 | 13 | 15 | 20 | 15.5 | 20 | 14 | 15 |
| Mooney viscosity | 45 | 95 | 65 | 35 | 105 | 73 | 135 | 70 |
| $M_w/M_n$ | 5.5 | 4.8 | 5.3 | 8.4 | 4.5 | 7.3 | 4.1 | 5.5 |
| $T_g$ (°C.) | -68.7 | -58.7 | -65.9 | -71.2 | -60.5 | -65.4 | -56.1 | -65.2 |
| Branching index B | 0.835 | 0.892 | 0.840 | 0.752 | 0.881 | 0.780 | 0.872 | 0.832 |

Note:
(*1) Mole % based on a total amount of non-conjugated diene and α, ω-diene
(*2) 7-Methyl-1,6-octadiene
(*3) 1,9-Decadiene
(*4) 6-Methyl-1,5-heptadiene
(*5) 1,7-Octadiene

TABLE 2

| | Comparative Example | | | |
|---|---|---|---|---|
| | 1 | 2 | 3 | 4 |
| Copolymer rubber | r1 | r2 | r3 | r4 |
| Ethylene content (mole %) | 79.5 | 72 | 75.5 | 75 |
| α-olefin | 1-Octene | 1-Octene | Pro-pylene | Pro-pylene |
| Non-conjugated diene | ENB(*6) | MOD(*2) | ENB(*6) | MOD(*2) |
| Iodine value | 15 | 14 | 14 | 14 |
| Mooney viscosity | 57 | 24 | 85 | 88 |
| $M_w/M_n$ | 2.1 | 2.2 | 2.1 | 2.1 |
| $T_g$ (°C.) | -60.5 | -67.1 | -53.1 | -59.2 |
| Branching index B | 0.979 | 0.980 | 0.990 | 0.988 |

Note:
(*2) 7-Methyl-1,6-octadiene
(*6) 5-Ethylidene-2-norbornene

TABLE 3

| Formulation | Part by weight |
|---|---|
| Copolymer Rubber | 100 |
| Carbon black (*7) | 75 |
| Process oil (*8) | 35 |
| Zinc white | 5 |
| Stearic acid | 1 |
| Vulcanizing agent components | |
| Sulfur | 1.5 |
| Vulcanization accelerator M (*9) | 0.5 |
| Vulcanization accelerator TT (*10) | 1.0 |

Note:
(*7) Manufactured by Tokai Carbon Co., Ltd. (trade name: Seast G116)
(*8) Manufactured by Idemitsu Kosan Co., Ltd. (trade name: Diana Process Oil PW-380)
(*9) Mercaptobenzothiazole
(*10) Tetramethylthiuram disulfide

TABLE 4

| | Example | | | | | | | |
|---|---|---|---|---|---|---|---|---|
| | 1 | 2 | 3 | 4 | 5 | 6 | 7 | 8 |
| Copolymer rubber | R1 | R2 | R3 | R4 | R5 | R6 | R7 | R8 |
| Processing characteristics | | | | | | | | |
| Roll-processability | 5 | 5 | 5 | 5 | 5 | 5 | 5 | 5 |
| Tack | ⊚ | ⊚ | ⊚ | ○ | ⊚ | ⊚ | ⊚ | ⊚ |
| Physical properties of vulcanizate | | | | | | | | |
| TB (MPa) | 12.6 | 18.1 | 13.9 | 11.4 | 18.0 | 13.2 | 17.0 | 14.1 |
| EB (%) | 280 | 350 | 260 | 250 | 290 | 280 | 310 | 260 |
| Hardness (JIS-A) | 64 | 73 | 66 | 62 | 78 | 67 | 75 | 66 |
| Compression set (70° C. × 22 hrs) (%) | 7 | 13 | 9 | 5 | 8 | 11 | 9 | 8 |
| Low-temperature characteristics | | | | | | | | |
| Gehman temp. T5 (°C.) | −58.9 | −54.3 | −57.2 | −59.7 | −55.5 | −56.6 | −52.1 | −57.0 |

TABLE 5

| | Comparative Example | | | |
|---|---|---|---|---|
| | 1 | 2 | 3 | 4 |
| Copolymer rubber | r1 | r2 | r3 | r4 |
| Processing characteristics | | | | |
| Roll-processability | 3 | 3 | 2 | 2 |
| Tack | Δ | Δ | ⊚ | ⊚ |
| Physical properties of vulcanizate | | | | |
| TB (MPa) | 11.5 | 11.7 | 13.5 | 13.6 |
| EB (%) | 280 | 280 | 300 | 300 |
| Hardness (JIS-A) | 66 | 65 | 71 | 70 |
| Compression set (70° C. × 22 hrs) (%) | 11 | 11 | 14 | 14 |
| Low-temperature characteristics | | | | |
| Gehman temp. T5 (°C.) | −53.5 | −57.6 | −49.5 | −53.9 |

EXAMPLES 9 AND 10

Copolymer Rubber (R2) or (R3), natural rubber and the remaining components shown in Table 6 other than the vulcanizing agent components were kneaded using a Laboplastomill (internal volume: 250 milliliters) at 60 rpm at 60° C. for 150 seconds to obtain a compound (i). Subsequently, to the compound (i) were added the vulcanizing agent components shown in Table 6 and they were kneaded on a 10-inch roll kept at 50° C. for 5 minutes to obtain a compound (ii).

Subsequently, the compound (ii) was heated for 30 minutes by a hot press heated at 160° C. under such a pressure that the press pressure was 150 kgf/cm² to prepare a vulcanized sheet having a size of 120×120×2 mm and a sample for compression set test, which were then subjected to evaluation of various characteristics.

As a result, the compositions using these Copolymer Rubbers were excellent in co-vulcanizability and also excellent in balance between the processing characteristics and the mechanical characteristics and resistance to dynamic fatigue. The evaluation results are shown in Table 7.

COMPARATIVE EXAMPLES 5 TO 7

In the same manner as in Example 9 or 10, except that Copolymer Rubber (r1), (r3) or (r4) was substituted for the Copolymer Rubber (R2) or (R3), compounds (i) and (ii) were prepared and evaluation of various physical properties was conducted.

As a result, the compositions using these Copolymer Rubbers were inferior in co-vulcanizability and insufficient in balance between the processing characteristics and the mechanical characteristics and resistance to dynamic fatigue. The evaluation results are shown in Table 7.

TABLE 6

| Formulation | Part by weight |
|---|---|
| Copolymer Rubber | 50 |
| Natural rubber (*11) | 50 |
| Carbon black (*12) | 60 |
| Process oil (*8) | 40 |
| Zinc white | 5 |
| Stearic acid | 1 |
| Vulcanizing agent components | |
| Sulfur | 1.5 |

TABLE 6-continued

| Formulation | Part by weight |
| --- | --- |
| Vulcanization accelerator MSA (*13) | 0.5 |
| Vulcanization accelerator D (*14) | 1.0 |

Note:
(*8) Manufactured by Idemitsu Kosan Co., Ltd. (trade name: Diana Process Oil PW-380)
(*11) Manufactured by (trade name: RSS#1)
(*12) Manufactured by Tokai Carbon Co., Ltd. (trade name: Seast SO)
(*13) N-Oxydiethylene-2-benzothiazole sulfenamide
(*14) Diphenyl guanidine nized sheet having a size of 120×120×2 mm and a sample for compression set test, which were then subjected to evaluation of various characteristics.

The formulation is shown in Table 8 and the evaluation results are shown in Table 7.

COMPARATIVE EXAMPLES 8 TO 10

In the same manner as in Example 11 or 12, except that Copolymer Rubber (r1), (r3) or (r4) was substituted for the Copolymer Rubber (R2) or (R3), compounds (i) and (ii) were prepared and evaluation of various physical properties was conducted.

As a result, the compositions using these Copolymer Rubbers were inferior in co-vulcanizability and insufficient

TABLE 7

| | Example | | Comparative Example | | |
| --- | --- | --- | --- | --- | --- |
| | 9 | 10 | 5 | 6 | 7 |
| Copolymer rubber | R2 | R3 | r1 | r2 | r3 |
| Processing characteristics | | | | | |
| Roll-processability | 5 | 5 | 3 | 3 | 3 |
| Dumped compound apppearance in plastomill | ◎ | ◎ | Δ | Δ | Δ |
| Vulcanization characteristics | | | | | |
| MH (dN m) | 7.5 | 9.5 | 6.5 | 6.3 | 7.5 |
| Physical properties of vulcanizate | | | | | |
| TB (MPa) | 9.5 | 11.0 | 6.8 | 6.0 | 8.0 |
| EB (%) | 510 | 450 | 390 | 330 | 450 |
| Elongation fatigue | | | | | |
| Number of cycles (crack propagation) | 5,100 | 4,800 | 1,350 | <300 | 1,500 |
| Number of cycles (crack generation) | 41,000 | 28,000 | 8,000 | 6,700 | 12,000 |
| Ozone resistance test (crack generation time) (hrs) | Not generated | Not generated | Not generated | Not generated | Not generated |

The ethylene copolymer rubber composition of the first invention is excellent in processing characteristics and also excellent in balance between the processing characteristics and, mechanical characteristics and low-temperature characteristics. The ethylene copolymer rubber composition of the second invention is excellent in co-vulcanizability and also excellent in balance between the processing characteristics and the mechanical characteristics and resistance to dynamic fatigue and further excellent in low-temperature characteristics, weather resistance, ozone resistance and the like. Accordingly, these ethylene copolymer rubber compositions can be very suitably employed in a wide use.

EXAMPLES 11 AND 12

Copolymer Rubber (R2) or (R3), natural rubber and the remaining components shown in Table 8 other than the vulcanizing agent components were kneaded using a Labo-plastomill (internal volume: 250 milliliters) at 60 rpm at 60° C. for 150 seconds to obtain a compound (i). Subsequently, to the compound (i) were added the vulcanizing agent components and they were kneaded on a 10-inch roll kept at 50° C. for 5 minutes to obtain a compound (ii).

Subsequently, the compound (ii) was heated for 30 minutes by a hot press heated at 160° C. under such a pressure that the press pressure was 150 kgf/cm² to prepare a vulcain balance between the processing characteristics and the mechanical characteristics and resistance to dynamic fatigue. The evaluation results are shown in Table 9.

TABLE 8

| Formulation | Part by weight |
| --- | --- |
| Natural rubber (*11) | 70 |
| Ethylenic polymer | 30 |
| Carbon black (*12) | 60 |
| Process oil (*8) | 40 |
| Zinc white | 5 |
| Stearic acid | 1 |
| Vulcanizing agent components | |
| Sulfur | 1.5 |
| Vulcanization accelerator MSA (*13) | 0.5 |
| Vulcanization accelerator D (*14) | 1.0 |

Note:
(*8) Manufactured by Idemitsu Kosan Co., Ltd. (trade name: Diana Process Oil PW-380)
(*11) Manufactured by (trade name: RSS#1)
(*12) Manufactured by Tokai Carbon Co., Ltd. (trade name: Seast SO)
(*13) N-Oxydiethylene-2-benzothiazole sulfenamide
(*14) Diphenyl guanidine

TABLE 9

|  | Example | | Comparative Example | | |
|---|---|---|---|---|---|
|  | 11 | 12 | 8 | 9 | 10 |
| Ethylenic polymer | Ex. 2 | Ex. 3 | Comp. Ex. 1 | Comp. Ex. 3 | Comp. Ex. 4 |
| Processing characteristics | | | | | |
| Roll-processability | 5 | 5 | 4 | 4 | 4 |
| Dumped compound appearance in plastomill | ◎ | ◎ | o-Δ | o-Δ | o-Δ |
| Vulcanization characteristics | | | | | |
| MH (dN m) | 7.3 | 7.5 | 6.8 | 6.9 | 7.5 |
| Physical properties of vulcanizate | | | | | |
| TB (MPa) | 11.5 | 12.0 | 11.1 | 11.3 | 12.0 |
| EB (%) | 470 | 500 | 450 | 470 | 480 |
| Elongation fatigue | | | | | |
| Number of cycles (crack propagation) | 5,000 | 7,600 | 4,900 | 3,200 | 5,500 |
| Number of cycles (crack generation) | 38,000 | 41,000 | 29,000 | 25,000 | 35,000 |
| Ozone resistance test crack generation time (hrs) | 60 | 72 | 16 | 8 | 48 |

What is claimed is:

1. An ethylene copolymer rubber composition which comprises an ethylene copolymer rubber and at least one member selected from the group consisting of a vulcanizing agent and a cross-linking agent, said ethylene copolymer rubber being composed of ethylene, an α-olefin having 3 to 12 carbon atoms, a non-conjugated diene represented by the following structural formula (I):

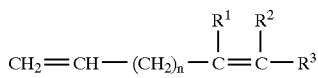

$$CH_2=CH-(CH_2)_n-\underset{\underset{R^1}{|}}{C}=\underset{\underset{R^2}{|}}{C}-R^3 \quad (I)$$

wherein $R^1$ and $R^2$ represent independently hydrogen atoms or alkyl groups having 1 to 8 carbon atoms, $R^3$ represents an alkyl group having 1 to 8 carbon atoms, and n is an integer of 2 to 10, and an α,ω-diene represented by the following structural formula (II):

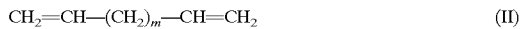

$$CH_2=CH-(CH_2)_m-CH=CH_2 \quad (II)$$

wherein m is an integer of 1 to 10, and satisfying the following requirements (1) to (6):

(1) The mole ratio of ethylene and the α-olefin having 3 to 12 carbon atoms (ethylene/α-olefin) is in the range of from 40/60 to 90/10;

(2) The iodine value is in the range of from 5 to 45;

(3) The Mooney viscosity ($ML_{1+4}$, 100° C.) is in the range of from 15 to 350;

(4) The ratio of polystyrene-reduced weight average molecular weight ($M_w$) determined by a gel permeation chromatography (GPC) to polystyrene-reduced number average molecular weight ($M_n$) determined by GPC ($M_w/M_n$) is in the range of from 2.5 to 15;

(5) The glass transition temperature ($T_g$) determined by a differential scanning calorimeter (DSC) is in the range of from −55° C. to −80° C.;

(6) The branching index B as defined herein is in the range of from 0.60 to 0.95.

2. An ethylene copolymer rubber composition which comprises the ethylene copolymer rubber according to claim 1, a conjugated diene rubber and at least one member selected from the group consisting of a vulcanizing agent and a cross-linking agent, the weight ratio of the ethylene copolymer rubber to the conjugated diene rubber (ethylene copolymer rubber/conjugated diene rubber) being in the range of from 20/80 to 90/10.

3. The ethylene copolymer rubber composition according to claim 1 or 2, wherein the ethylene copolymer rubber is composed of ethylene; at least one α-olefin selected from the group consisting of propylene, 1-butene, 1-hexene and 1-octene; at least one non-conjugated diene selected from the group consisting of 6-methyl-1,5-hepatadiene, 7-methyl-1,6-octadiene, 8-methyl-1,7-nonadiene and 9-methyl-1,8-decadiene; and at least one α,ω-diene selected from the group consisting of 1,5-hexadiene, 1,7-octadiene and 1,9-decadiene.

4. The ethylene copolymer rubber composition according to claim 1 or 2, wherein the mole ratio of ethylene to the α-olefin is in the range of from 60/40 to 87/13.

5. The ethylene copolymer rubber composition according to claim 4, wherein the ethylene copolymer rubber has an iodine value in the range of from 10 to 35; a Mooney viscosity in the range of from 20 to 300; an $M_w/M_n$ ratio in the range of from 3 to 10; a glass transition temperature as determined by DSC of in the range of from −56° C. to −75° C. and a branching index B as defined herein in the range of from 0.70 to 0.92.

6. The ethylene copolymer rubber composition according to claim 2, wherein the conjugated diene is at least one member selected from the group consisting of natural rubber, styrene-butadiene rubber, polybutadiene rubber, polyisoprene rubber and hydrogenation products thereof.

7. The ethylene copolymer rubber composition according to claim 6, wherein the conjugated diene rubber has a Mooney viscosity of 10 to 100.

8. The ethylene copolymer rubber composition according to claim 2, wherein the weight ratio of the ethylene copolymer rubber to the conjugated diene rubber is in the range of 30/70 to 70/30.

9. The ethylene copolymer rubber composition according to claim 1 or 2, wherein the vulcanizing agent is sulfur selected from the group consisting of powdery sulfur, precipitated sulfur, colloidal sulfur and insoluble sulfur; an inorganic vulcanizing agent selected from the group consisting of sulfur chloride, selenium and tellurium; or a sulfur-containing organic compound selected from the group consisting of morpholine, alkylphenol disulfides, thiuram disulfides and dithiocarbamic acid salts and contained in a proportion of 0.1 to 10 parts by weight per 100 parts by weight of the ethylene copolymer rubber; and the cross-linking agent is an organic peroxide selected from the group consisting of 1,1-di-tert-butylperoxy-3,3,5-trimethylcyclohexane, di-tert-butyl peroxide, dicumyl peroxide, tert-butylcumyl peroxide, 2,5-dimethyl-2,5-di(tert-butylperoxy)hexane and 1,3-bis(tert-butylperoxyisopropyl)benzene and contained in a proportion of 0.1 to 15 parts by weight per 100 parts by weight of the ethylene copolymer rubber.

* * * * *